United States Patent Office 3,063,805
Patented Nov. 13, 1962

3,063,805
PRODUCTION OF POTASSIUM HYDROXIDE
James G. Gilchrist, Jr., Bartow, Fla., assignor to International Minerals & Chemical Corporation, a corporation of New York
No Drawing. Filed Sept. 1, 1959, Ser. No. 837,365
21 Claims. (Cl. 23—184)

The present invention generally relates to the production of potassium hydroxide. More particularly, it relates to a novel process for producing potassium hydroxide from materials containing potassium sulfate.

Potassium hydroxide is extensively used in the soap industry and in the textile industry. Potassium hydroxide is presently commercially prepared by the electrolysis of a solution of potassium chloride in either diaphragm of mercury amalgam cell. The present invention is directed to a new process for preparing potassium hydroxide by reacting a potassium sulfate-containing material with sodium hydroxide.

Accordingly, it is an object of the present invention to provide a new process for preparing potassium hydroxide.

It is another object of the present invention to provide a new process for preparing potassium hydroxide from potassium sulfate.

These and other objects and advantages of the present invention will be apparent to those skilled in the art from the following description of the invention.

In general, the present invention is a process for producing potassium hydroxide which comprises commingling a potassium sulfate-containing material with sodium hydroxide in a substantially anyhdrous liquid medium. The process is illustrated by the following equation:

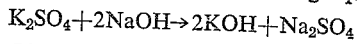

$$K_2SO_4 + 2NaOH \rightarrow 2KOH + Na_2SO_4$$

THE STARTING MATERIALS

In accordance with the present invention, the starting materials or reactants comprise a potassium sulfate-containing material and sodium hydroxide.

The reaction must be conducted in a substantially anhydrous liquid medium and, therefore, the potassium sulfate-containing material is used in a substantially anhydrous form. The present invention contemplates the use of potassium sulfate in substantially pure solid form as well as in solid form with impurities. Potassium sulfate salts such as glaserite ($Na_2SO_4 \cdot 3K_2SO_4$), langbeinite ($2MgSO_4 \cdot K_2SO_4$), leonite

($MgSO_4 \cdot K_2SO_4 \cdot 4H_2O$)

schoenite ($K_2SO_4 \cdot MgSO_4 \cdot 9H_2O$) and syngenite ($K_2SO_4 \cdot CaSO_4 \cdot H_2O$)

may also be used; however, substantially pure potassium sulfate is preferred. The potassium sulfate-containing material is, of course, used in a finely divided form so as to obtain a high rate of reaction.

The sodium hydroxide is also used in a substantially anhydrous form. The present invention contemplates the use of solid sodium hydroxide and preferably substantially pure solid sodium hydroxide. The sodium hydroxide is preferably in solution in a substantially anhydrous solvent. The solvent used to prepare the substantially anhydrous solution of sodium hydroxide is preferably the substantially anhydrous liquid medium in which the reaction between the potassium sulfate and the sodium hydroxide is conducted; however, another suitable and compatible solvent may be used if desired.

The relative amounts of potassium sulfate-containing material and sodium hydroxide are not of critical importance; that is potassium sulfate may be present in stoichiometric excess, or sodium hydroxide may be present in stoichiometric excess, or they may be present in stoichiometric amounts. In general, since the potassium sulfate is more readily separated from potassium hydroxide than is sodium hydroxide, it is preferable to use an excess of potassium sulfate, or, in other words, sodium hydroxide is preferably used in less than the stoichiometric amount. It is also preferred to use less than the stoichiometric amount of sodium hydroxide since greater conversions to KOH are indicated under these conditions. In general, it is also preferable that the amount of sodium hydroxide used is less than required to make a saturated solution in the substantially anhydrous liquid medium; that is, under the reaction conditions, the liquid medium should be substantially unsaturated with respect to sodium hydroxide so that the potassium hydroxide formed may readily remain in solution in the liquid medium. It is preferable that the sodium hydroxide be present in the reaction zone in an amount less than half that required to saturate the liquid medium at the reaction conditions.

THE ANHYDROUS LIQUID MEDIUM

The reaction between the potassium sulfate and the sodium hydroxide is conducted in a substantially anhydrous liquid medium. The liquid medium is one in which potassium hydroxide and sodium hydroxide are soluble under the reaction conditions and in which the resultant sodium sulfate is substantially insoluble.

The liquid medium is preferably a substantially anhydrous hydroxyl substituted paraffinic hydrocarbon or a hydroxyl substituted ether, or dioxane, or mixtures thereof. Ethylene glycol is a specifically preferred liquid medium. Propylene glycol, glycerol, methylglycerol and thylene glycol may also be used. $C_1$ to $C_5$ alcohols, such as methyl alcohol, ethyl alcohol, propyl alcohol, n-butyl alcohol, etc., are contemplated as the liquid medium.

Of the hydroxyl substituted ethers, the monoalkyl ethers, marketed under the trade name of Cellosolve, are preferred. These materials are usually obtained by the alcoholysis of ethylene oxide. Methyl Cellosolve, ethyl Cellosolve, propyl Cellosolve or n-butyl Cellosolve may be used. Dioxane, $C_4H_8O_2$, may also be used. Small amounts of water may be present in the reaction zone; however, the reaction preferably takes place under substantially anhydrous conditions since with appreciable amounts of water the yield is lowered significantly.

THE REACTION CONDITIONS

The reaction is conducted in a substantially anhydrous liquid medium. Therefore, the reaction conditions must be such as to maintain the selected medium in the liquid phase during the reaction. When the medium selected is not a liquid at ambient conditions, higher or lower temperatures and/or pressures are used so as to maintain a liquid phase. When temperatures above the boiling point of the medium are used, pressure is utilized to maintain a liquid phase. The temperature, however, should be below the decomposition temperature of the liquid medium. In general, at higher temperatures, the rate of reaction is more rapid than at lower temperatures. The temperature is preferably above 0° C. and more preferably above 25° C. Good results have been obtained when operating within the range of from about 50° C. to about 250° C. In general, sufficient anhydrous liquid medium is used to maintain all of the potassium hydroxide and sodium hydroxide in solution in the medium. The reactants are commingled and preferably agitated for a period of time to form a substantial amount of potassium hydroxide. In general the reaction is conducted for at least five minutes and preferably for at least 30 minutes.

The potassium hydroxide formed is soluble in the liquid medium and in accordance with the present invention, after the reaction period, the potassium hydroxide may be recovered or treated in any other suitable manner. The resultant liquid phase may be separated from the sodium sulfate-containing solids in any suitable manner such as by filtration or centrifugation. The potassium hydroxide in the separated liquid phase may be recovered by distilling off the liquid medium or any other suitable method may be used. The potassium hydroxide, before or after separation from the liquid phase may be carbonated with carbon dioxide to produce $K_2CO_3$.

In order to give a fuller understanding of the invention, but with no intention to be limited thereto, the following examples are given.

Example I 8.0 grams of solid sodium hydroxide were added to 200 grams of ethylene glycol and heated to 125° C. to dissolve the sodium hydroxide. When the sodium hydroxide had completely gone into solution, 17.4 grams of a fertilizer grade potassium sulfate were added. The reaction mixture was maintained at 125° C. for four hours and then filtered. The filter cake was dried in an oven for 16 hours at 100° C. The results of the test are tabulated below:

TABLE 1

|  |  | Feed | Filtrate | Dried Cake |
|---|---|---|---|---|
| Wgt., gms. |  |  | 200.1 | 16.7 |
| K: | Wgt., percent |  | 0.706 | 31.14 |
|  | Wgt., gms. | 7.5 | 1.41 | 5.2 |
|  | Percent recovered |  | 18.8 | 69.3 |
| Na: | Wgt., percent |  | 1.58 | 7.0 |
|  | Wgt., gms. | 4.6 | 3.16 | 1.17 |
|  | Percent recovered |  | 68.7 | 25.4 |
| $SO_4$: | Wgt., percent |  | 0.015 | 59.03 |
|  | Wgt., gms. | 9.5 | 0.03 | 9.52 |
|  | Percent Recovered |  | 0.03 | 100.0 |
| OH: | Wgt., percent |  | 1.36 | 0.79 |
|  | Wgt., gms. | 3.4 | 2.72 | 0.13 |
|  | Percent Recovered |  | 80.0 | 3.8 |

The above data illustrates that the reaction was about 18.8% complete.

Example II 8.0 grams of solid sodium hydroxide were added to 200 grams of ethylene glycol and heated to 100° C. to dissolve the sodium hydroxide. When the sodium hydroxide had completely gone into solution, 17.4 grams of a fertilizer grade potassium sulfate were added. The reaction mixture was maintained at 100° C. for one hour and then filtered. The filter cake was dried in an oven for 16 hours at 100° C. The results of the test are tabulated below:

TABLE 2

|  |  | Feed | Filtrate | Dried Cake |
|---|---|---|---|---|
| Wgt., gms. |  |  | 214.0 | 16.4 |
| K: | Wgt., percent |  | 0.991 | 32.6 |
|  | Wgt., gms. | 7.8 | 2.12 | 5.35 |
|  | Percent Recovered |  | 27.2 | 68.6 |
| Na: | Wgt., percent |  | 1.49 | 8.7 |
|  | Wgt., gms. | 4.6 | 3.19 | 1.43 |
|  | Percent Recovered |  | 69.4 | 31.1 |
| $SO_4$: | Wgt., percent |  | 0.01 | 57.5 |
|  | Wgt., gms. | 9.6 | 0.021 | 9.35 |
|  | Percent Recovered |  | 0.02 | 97.4 |
| OH: | Wgt., percent |  | 1.45 | 0.08 |
|  | Wgt. gms. | 3.4 | 3.1 | 0.013 |
|  | Percent Recovered |  | 91.2 | 0.04 |

The above data indicates that the reaction was approximately 27% complete.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for producing potassium hydroxide which comprises commingling a potassium sulfate-containing material with sodium hydroxide in a substantially inert, anhydrous organic liquid medium in which potassium hydroxide and sodium hydroxide are soluble under the commingling conditions and in which the resultant sodium sulfate is substantially insoluble, thereby forming solid sodium sulfate and a liquid solution of potassium hydroxide in said liquid medium, separating said solid sodium sulfate from said liquid solution, and recovering potassium hydroxide from said separated liquid solution of potassium hydroxide.

2. A process for producing potassium hydroxide which comprises reacting potassium sulfate with sodium hydroxide in a substantially inert, anhydrous organic liquid medium at a temperature above 0° C. and below the decomposition temperature of said liquid medium, said liquid medium being one in which potassium hydroxide and sodium hydroxide are soluble under the reaction conditions and in which the resultant sodium sulfate is substantially insoluble, thereby forming solid sodium sulfate and a liquid solution of potassium hydroxide in said liquid medium, separating said solid sodium sulfate from said liquid solution, and recovering potassium hydroxide from said separated liquid solution of potassium hydroxide.

3. A process for producing potassium hydroxide which comprises reacting potassium sulfate with sodium hydroxide in a substantially inert, anhydrous organic liquid medium at a temperature above 25° C. and below the decomposition temperature of said liquid medium for a period of time to form a substantial amount of potassium hydroxide and solid sodium sulfate, separating the resultant liquid containing potassium hydroxide in solution from the solids in the resultant mixture, said liquid medium being one in which potassium hydroxide and sodium hydroxide are soluble under the reaction conditions and in which the resultant sodium sulfate is substantially insoluble and recovering potassium hydroxide from said separated liquid solution.

4. A process for producing potassium hydroxide which comprises commingling a solution of sodium hydroxide in a substantially inert, anhydrous organic liquid in which potassium hydroxide and sodium hydroxide are soluble under the reaction conditions and in which the resultant sodium sulfate is substantially insoluble with potassium sulfate at a temperature within the range of from about 50° C. to about 250° C. for at least five minutes thereby forming a liquid solution containing potassium hydroxide and solid sodium sulfate, separating said solid sodium sulfate from said liquid solution, and recovering potassium hydroxide from said liquid solution.

5. A process for producing potassium hydroxide which comprises commingling a solution of sodium hydroxide in a substantially inert, anhydrous organic liquid in which potassium hydroxide and sodium hydroxide are soluble under the reaction conditions and in which the resultant sodium sulfate is substantially insoluble with potassium sulfate at a temperautre above 25° C. and below the decomposition temperature of the solvent for at least five minutes, said solution being substantially unsaturated with respect to sodium hydroxide, thereby forming a liquid solution containing potassium hydroxide and solid sodium sulfate, separating said solid sodium sulfate from said liquid solution, and recovering potassium hydroxide from said liquid solution.

6. A process for producing potassium hydroxide which comprises commingling a potassium sulfate-containing material with sodium hydroxide in a substantially inert, anhydrous liquid medium selected from the group consisting of hydroxyl substituted paraffinic hydrocarbons, hydroxyl substituted ethers, dioxane, and mixtures of the foregoing.

7. A process for producing potassium hydroxide which comprises commingling a solution of sodium hydroxide with potassium sulfate at a temperature above 25° C. and below the decomposition temperature of the solvent for at least 5 minutes, said solvent being a substantially inert, anhydrous liquid material selected from the group consisting of hydroxyl substituted paraffinic hydrocarbons, hydroxyl substituted ethers, dioxane, and mixtures of the foregoing, said solution being substantially unsaturated with respect to sodium hydroxide, thereby forming a solution containing potassium hydroxide and solid sodium sulfate.

8. The process of claim 7 wherein said substantially anhydrous solution of sodium hydroxide comprises sodium hydroxide in solution in a substantially anhydrous hydroxyl substituted paraffinic hydrocarbon.

9. The process of claim 7 wherein said substantially anhydrous solution of sodium hydroxide comprises sodium hydroxide in solution in dioxane.

10. The process of claim 7 wherein said substantially anhydrous solution of sodium hydroxide comprises sodium hydroxide in solution in a hydroxyl substituted ether.

11. The process of claim 8 wherein said hydroxyl substituted paraffinic hydrocarbon comprises methyl alcohol.

12. The process of claim 8 wherein said hydroxyl substiuted paraffinic hydrocarbon comprises ethyl alcohol.

13. The process of claim 8 wherein said hydroxyl substituted paraffinic hydrocarbon comprises propyl alcohol.

14. The process of claim 8 wherein said hydroxyl substiuted paraffinic hydrocarbon comprises ethylene glycol.

15. The process of claim 8 wherein said hydroxyl substituted paraffinic hydrocarbon comprises propylene glycol.

16. The process of claim 8 wherein said hydroxyl substituted paraffinic hydrocarbon comprises glycerol.

17. The process of claim 8 wherein said hydroxyl substituted paraffinic hydrocarbon comprises methyl glycerol.

18. The process of claim 10 wherein said hydroxyl substituted ether comprises methyl Cellosolve.

19. The process of claim 10 wherein said hydroxyl substiuted ether comprises ethyl Cellosolve.

20. The process of claim 10 wherein said hydroxyl substituted ether comprises propyl Cellosolve.

21. The process of claim 10 wherein said hydroxyl substituted ether comprises n-butyl Cellosolve.

References Cited in the file of this patent

UNITED STATES PATENTS

| 1,302,937 | Leonis | May 6, 1919 |
| 1,990,896 | Connell | Feb. 12, 1935 |
| 2,136,996 | Wiedbrauck | Nov. 15, 1938 |
| 2,685,434 | Cross | Aug. 3, 1954 |
| 2,824,785 | Merlub-Sobel | Feb. 25, 1958 |

OTHER REFERENCES

Roscoe and Schorlemmer: vol. II, 1907 ed., "A Treatise on Chemistry," pages 335, 336, MacMillian and Co., Ltd., London.

Chem. Abstracts, vol. 50, Nov. 25, 1956, p. 16320.

Jacobson: "Encyclopedia of Chemical Reactions," vol. 6, 1956, page 323, Reinhold Publ. Corp., New York.